(12) United States Patent
Zhao et al.

(10) Patent No.: US 9,886,133 B2
(45) Date of Patent: Feb. 6, 2018

(54) NOISE SCANNING METHOD, NOISE SCANNING DEVICE AND TOUCH PANEL

(71) Applicant: BOE TECHNOLOGY GROUP CO., LTD., Beijing (CN)

(72) Inventors: Jiayang Zhao, Beijing (CN); Guangliang Shang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 65 days.

(21) Appl. No.: 15/101,338

(22) PCT Filed: Oct. 9, 2015

(86) PCT No.: PCT/CN2015/091543
§ 371 (c)(1),
(2) Date: Jun. 2, 2016

(87) PCT Pub. No.: WO2016/184013
PCT Pub. Date: Nov. 24, 2016

(65) Prior Publication Data
US 2017/0115820 A1   Apr. 27, 2017

(30) Foreign Application Priority Data
May 15, 2015   (CN) .......................... 2015 1 0250018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ...... G06F 3/0418; G06F 3/0412; G06F 3/044; G06F 3/041
See application file for complete search history.

(56) References Cited

U.S. PATENT DOCUMENTS 9,189,113 B2 * 11/2015 Yoshimura .............. G06F 3/044
9,405,416 B2 *  8/2016 Kang ...................... G06F 3/044
(Continued)

FOREIGN PATENT DOCUMENTS

CN         103049148 A      4/2013
CN         103135811 A      6/2013
(Continued)

OTHER PUBLICATIONS

Second Office Action regarding Chinese Application No. 201510250018.1, dated Jul. 24, 2017. Translation provided by Dragon Intellectual Property Law Firm.
(Continued)

*Primary Examiner* — Vijay Shankar
(74) *Attorney, Agent, or Firm* — Harness, Dickey & Pierce, P.L.C.

(57) ABSTRACT

The present disclosure provides a noise scanning method, a noise scanning device and a touch panel. The noise scanning method includes steps of performing a touch scanning operation on the touch panel, performing a noise scanning operation on the plurality of touch driving lines Tx or the plurality of touch sensing lines Rx while performing the touch scanning operation, and acquiring a position of each touch unit on the touch panel in accordance with a result of the touch scanning operation and a result of the noise scanning operation.

11 Claims, 7 Drawing Sheets

(56) References Cited

U.S. PATENT DOCUMENTS

| | | |
|---|---|---|
| 2013/0222322 A1 | 8/2013 | Drew |
| 2013/0321332 A1 | 12/2013 | Yoshimura |
| 2014/0160065 A1 | 6/2014 | Zhang et al. |
| 2015/0084923 A1 | 3/2015 | Kang |
| 2017/0115820 A1 | 4/2017 | Zhao et al. |

FOREIGN PATENT DOCUMENTS

| | | |
|---|---|---|
| CN | 103164090 A | 6/2013 |
| CN | 103543888 A | 1/2014 |
| CN | 104461192 A | 3/2015 |
| CN | 104808863 A | 7/2015 |

OTHER PUBLICATIONS

First Office Action regarding Chinese Application No. 201510250018.1, dated Apr. 24, 2017. Translation provided by Dragon Intellectual Property Law Firm.
Written Opinion of the International Searching Authority and International Search Report regarding International Application No. PCT/CN2015/091543, dated Jan. 29, 2016. Translation provided by Dragon Intellectual Property Law Firm.

* cited by examiner

NOISE SCANNING METHOD, NOISE SCANNING DEVICE AND TOUCH PANEL

CROSS-REFERENCE TO RELATED APPLICATIONS

This application is the U.S. national phase of PCT Application No. PCT/CN2015/091543 filed on Oct. 9, 2015, which claims a priority of the Chinese Patent Application No. 201510250018.1 filed on May 15, 2015, the disclosures of which are incorporated in their entirety by reference herein.

TECHNICAL FIELD

The present disclosure relates to the field of touch display technology, in particular to a noise scanning method, a noise scanning device and a touch panel.

BACKGROUND

An in-cell touch display panel includes a display panel and a touch panel built in the display panel. During the actual application, accuracy of a touch scanning operation may be adversely affected by a surrounding work environment of the in-cell touch display panel. In the related art, an influence value of the surrounding work environment of the in-cell display panel on the touch scanning operation may be acquired through a noise scanning operation. However, an influence value of a display scanning signal on the touch scanning operation cannot be acquired through the noise scanning operation. As a result, it is impossible to accurately acquire a position of each touch unit on the in-cell touch display panel, and thereby an undesired touch scanning effect will be achieved.

SUMMARY

An object of the present disclosure is to provide a noise scanning method, a noise scanning device and a touch panel, so as to improve the touch scanning effect during a touch scanning operation on the touch panel.

In one aspect, the present disclosure provides in some embodiments a noise scanning method for a touch display device including a touch panel. The touch panel includes a plurality of touch units arranged in an array form, a plurality of touch driving lines Tx arranged in an array form, and a plurality of touch sensing lines Rx arranged in an array form, and each touch driving line Tx is arranged perpendicular to each touch sensing line Rx. The noise scanning method includes steps of: performing a touch scanning operation on the touch panel; performing a noise scanning operation on the plurality of touch driving lines Tx or the plurality of touch sensing lines Rx while performing the touch scanning operation; and acquiring a position of each touch unit on the touch panel in accordance with a result of the touch scanning operation and a result of the noise scanning operation.

Alternatively, each touch driving line Tx corresponds to the touch units in a row, each touch sensing line Rx corresponds to the touch units in a column, and each touch driving line Tx is coupled to the touch sensing lines Rx. The step of performing the touch scanning operation on the touch panel includes: inputting a first scanning signal to a first touch driving line Tx, the first touch driving line Tx being any one of the plurality of touch driving lines Tx; and acquiring a second scanning signal generated on a first touch sensing line Rx in accordance with the first scanning signal on the first touch driving line Tx, the first touch sensing line Rx being any one of the plurality of touch sensing lines Rx.

Alternatively, the step of performing the noise scanning operation on the plurality of touch driving lines Tx includes, in response to the first scanning signal inputted to the first touch driving line Tx, performing the noise scanning operation on the first touch driving line Tx, so as to acquire a noise of the first scanning signal. Subsequent to the step of performing the noise scanning operation on the plurality of touch driving lines Tx, the noise scanning method further includes performing an additional noise scanning operation on the touch panel so as to acquire the other noise.

Alternatively, the touch display device is provided with a predetermined characteristic value of a Tx reference signal, and the noise scanning method further includes, in response to the first scanning signal inputted to the first touch driving line Tx, inputting the Tx reference signal to a second touch driving line Tx adjacent to the first touch driving line Tx. The step of performing the noise scanning operation on the first touch driving line Tx so as to acquire the noise of the first scanning signal includes: acquiring a characteristic value of a signal on the second touch driving line Tx; calculating a difference between the characteristic value of the signal on the second touch driving line Tx and the characteristic value of the Tx reference signal; and taking the difference as the noise of the first scanning signal.

Alternatively, the step of acquiring the position of each touch unit on the touch panel in accordance with the result of the touch scanning operation and the result of the noise scanning operation includes: subjecting the second scanning signal to first noise treatment in accordance with the noise of the first scanning signal, so as to acquire the second scanning signal after the first noise treatment; subjecting the second scanning signal after the first noise treatment to second noise treatment in accordance with the other noise, so as to acquire the second scanning signal after the second noise treatment; and acquiring a position of a first touch unit in accordance with the first scanning signal and the second scanning signal after the second noise treatment, the first touch unit corresponding to the first touch driving line Tx and the first touch sensing line Rx.

Alternatively, the step of performing the noise operation on the plurality of touch sensing lines Rx includes, in response to the acquisition of the second scanning signal, performing the noise scanning operation on the first touch sensing line Rx, so as to acquire a noise of the second scanning signal.

Alternatively, the touch panel is provided with a display region and a non-display region and includes a substrate, a reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1. The reference electrode group includes n reference electrodes, each reference electrode is coupled to corresponding additional touch driving lines Tx, and the n Tx groups each correspond to the respective reference electrode. A first Tx group includes the first touch driving line Tx corresponding to a first additional touch driving line Tx, a second Tx group is arranged adjacent to the first Tx group and corresponds to a second reference electrode, and the touch display device is provided with a predetermined characteristic value of an Rx reference signal. The noise scanning method further includes, in response to the first scanning signal inputted to the first touch driving line Tx, inputting the Tx reference signal to any one of the touch driving lines Tx in the second Tx group. The step of performing the noise scanning operation on the first touch sensing line Rx so as to acquire the noise of the second scanning signal includes acquiring a signal on the second reference electrode. The signal on the second reference electrode is generated in accordance with the Tx reference signal. The signal on the second reference electrode is a noise signal of the second scanning signal.

Alternatively, the step of acquiring the position of each touch unit on the touch panel in accordance with the result of the touch scanning operation and the result of the noise scanning operation includes: subjecting the second scanning signal to noise treatment in accordance with the noise of the second scanning signal, so as to acquire the second scanning signal after the noise treatment; and acquiring a position of a first touch unit in accordance with the first scanning signal and the second scanning signal after the noise treatment, the first touch unit corresponding to the first touch driving line Tx and the first touch sensing line Rx.

In another aspect, the present disclosure provides a noise scanning device for a touch display device including a touch panel. The touch panel includes a plurality of touch units arranged in an array form, a plurality of touch driving lines Tx arranged in an array form, and a plurality of touch sensing lines Rx arranged in an array form, and each touch driving line Tx is arranged perpendicular to each touch sensing line Rx. The noise scanning device includes: a touch scanning unit configured to perform a touch scanning operation on the touch panel; a noise scanning unit configured to perform a noise scanning operation on the plurality of touch driving lines Tx or the plurality of touch sensing lines Rx while the touch scanning operation is performed by the touch scanning unit; and an acquisition unit configured to acquire a position of each touch unit on the touch panel in accordance with a result of the touch scanning operation and a result of the noise scanning operation.

Alternatively, each touch driving line Tx corresponds to the touch units in a row, each touch sensing line Rx corresponds to the touch units in a column, and each touch driving line Tx is coupled to the touch sensing lines Rx. The touch scanning unit is further configured to: input a first scanning signal to a first touch driving line Tx, the first touch driving line Tx being any one of the plurality of touch driving lines Tx; and acquire a second scanning signal generated on a first touch sensing line Rx in accordance with the first scanning signal on the first touch driving line Tx, the first touch sensing line Rx being any one of the plurality of touch sensing lines Rx.

Alternatively, the noise scanning unit is further configured to, in response to the first scanning signal inputted to the first touch driving line Tx, perform the noise scanning operation on the first touch driving line Tx, so as to acquire a noise of the first scanning signal. The noise scanning device further includes an additional noise scanning unit configured to perform an additional noise scanning operation on the touch panel so as to acquire the other noise.

Alternatively, the touch display device is provided with a predetermined characteristic value of a Tx reference signal, and the noise scanning device further includes a first input unit configured to, in response to the first scanning signal inputted to the first touch driving line Tx, input the Tx reference signal to a second touch driving line Tx adjacent to the first touch driving line Tx. The noise scanning unit is further configured to: acquire a characteristic value of a signal on the second touch driving line Tx; calculate a difference between the characteristic value of the signal on the second touch driving line Tx and the characteristic value of the Tx reference signal; and take the difference as the noise of the first scanning signal.

Alternatively, the acquisition unit is further configured to: perform first noise treatment on the second scanning signal in accordance with the noise of the first scanning signal, so as to acquire the second scanning signal after the first noise treatment; perform second noise treatment on the second scanning signal after the first noise treatment in accordance with the other noise, so as to acquire the second scanning signal after the second noise treatment; and acquire a position of a first touch unit in accordance with the first scanning signal and the second scanning signal after the second noise treatment, the first touch unit corresponding to the first touch driving line Tx and the first touch sensing line Rx.

Alternatively, the noise scanning unit is further configured to, in response to the acquisition of the second scanning signal, perform the noise scanning operation on the first touch sensing line Rx, so as to acquire a noise of the second scanning signal.

Alternatively, the touch panel is provided with a display region and a non-display region and includes a substrate, a reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1. The reference electrode group includes n reference electrodes, each reference electrode is coupled to corresponding additional touch driving lines Tx, and the n Tx groups each correspond to the respective reference electrode. A first Tx group includes the first touch driving line Tx corresponding to a first additional touch driving line Tx, a second Tx group is arranged adjacent to the first Tx group and corresponds to a second reference electrode, and the touch display device is provided with a predetermined characteristic value of an Rx reference signal. The noise scanning device further includes a second input unit configured to, in response to the first scanning signal inputted to the first touch driving line Tx, input the Tx reference signal to any one of the touch driving lines Tx in the second Tx group. The noise scanning unit is further configured to acquire a signal on the second reference electrode. The signal on the second reference electrode is generated in accordance with the Tx reference signal. The signal on the second reference electrode is the noise of the second scanning signal.

Alternatively, the acquisition unit is further configured to: perform noise treatment on the second scanning signal in accordance with the noise of the second scanning signal, so as to acquire the second scanning signal after the noise treatment; and acquire a position of a first touch unit in accordance with the first scanning signal and the second scanning signal after the noise treatment, the first touch unit corresponding to the first touch driving line Tx and the first touch sensing line Rx.

In yet another aspect, the present disclosure provides in some embodiments a touch panel for the above-mentioned touch display device. The touch panel is provided with a display region and a non-display region and includes a substrate. A reference electrode group is arranged in one column on the substrate at a position corresponding to the non-display region and parallel to touch sensing lines Rx, a plurality of additional touch driving lines Tx is arranged transversely on the substrate at positions corresponding to the reference electrode group, and a plurality of touch driving lines Tx is connected to the respective additional touch driving lines Tx and divided into n Tx groups, where n is an integer greater than 1. The reference electrode group includes n reference electrodes, each reference electrode is coupled to corresponding additional touch driving lines Tx, and the n Tx groups each correspond to the respective reference electrode.

According to the noise scanning method, the noise scanning device and the touch panel in the embodiments of the present disclosure, the noise scanning operation is performed on the touch panel while performing the touch scanning operation. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

It should be appreciated that, the above general descriptions and the details in the following text are for illustrative purposes only, but shall not be used to limit the scope of the present disclosure.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

Figure 1:
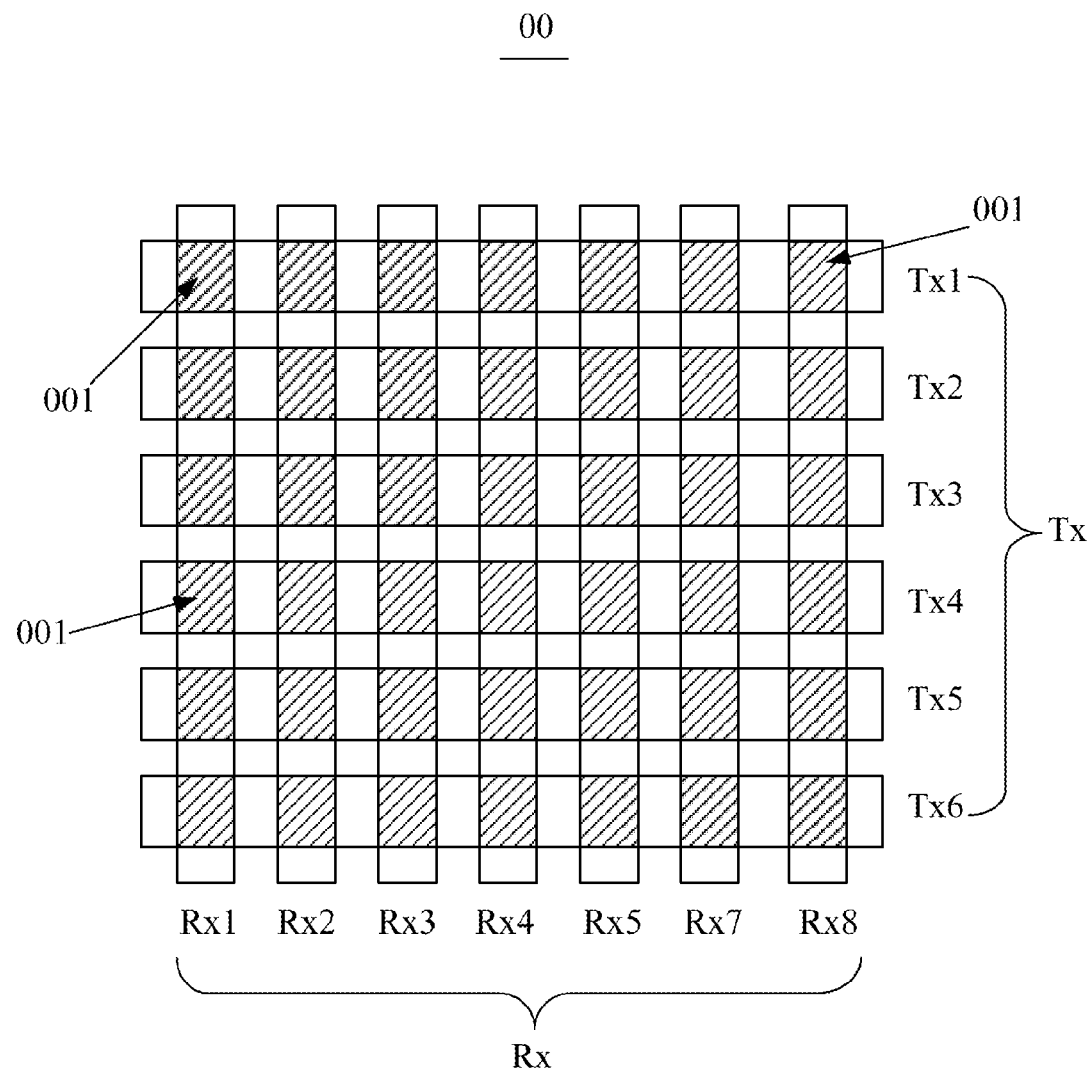
FIG. 1 is a schematic view showing a touch panel according to one embodiment of the present disclosure.

More details will be given hereinafter in conjunction with the drawings and the embodiments. The drawings and the descriptions thereof are merely used to describe concepts of the present disclosure, but shall not be used to limit the scope of the present disclosure in any ways.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the case that a touch function is to be achieved by an in-cell touch display panel, a touch scanning signal needs to be inputted to the in-cell touch display panel to perform a touch scanning operation, so as to acquire a position of each touch unit on the in-cell touch display panel. In the case that a display function is to be achieved by the in-cell touch display panel, a display scanning signal needs to be inputted to the in-cell touch display panel to perform a display scanning operation, so as to power on a plurality of pixels of the in-cell touch display panel. During the actual application, accuracy of the touch scanning operation, i.e., accuracy of the positions of the touch units, may be adversely affected by a surrounding work environment of the in-cell touch display panel.

In the related art, an influence value of the surrounding work environment of the in-cell display panel on the touch scanning operation may be acquired through a noise scanning operation, and then the position of each touch unit may be accurately acquired in accordance with the influence value. For example, a noise is a factor that may hinder the acquisition of the position of each touch unit on the in-cell touch display panel. To be specific, in unit scanning time, the touch scanning operation and the display scanning operation may be performed simultaneously on the in-cell touch display panel, so as to acquire the position of each touch unit, and then the noise scanning operation may be performed after the display scanning operation and the touch scanning operation, so as to accurately determine the position of each touch unit in accordance with a result of the noise scanning operation.

Because the touch scanning operation and the display scanning operation are performed simultaneously, the accuracy of the touch scanning operation may be adversely affected by a display scanning signal for the display scanning operation in the case that the position of each touch unit is acquired through the touch scanning operation. In addition, because the noise scanning operation is performed after the completion of the display scanning operation, it is impossible for the noise scanning operation to acquire an influence value of the display scanning signal on the touch scanning operation, and thereby it is impossible to accurately acquire the position of each touch unit on the in-cell touch display panel.

A touch display device may include a touch panel which includes a plurality of touch units arranged in an array form, a plurality of touch driving lines Tx arranged transversely and a plurality of touch sensing lines Rx arranged longitudinally. Each touch driving line Tx corresponds to the touch units in one row, and each touch sensing line Rx corresponds to the touch units in one column.

The present disclosure provides in some embodiments a touch panel 00 which, as shown in FIG. 1, may include a plurality of touch units 001 arranged in an array form, a plurality of touch driving lines Tx arranged in an array form, and a plurality of touch sensing lines Rx arranged in an array form. For example, the plurality of touch driving lines Tx may be arranged transversely, and the plurality of touch sensing lines Rx may be arranged longitudinally. In FIG. 1, there are 6 touch driving lines Tx and 8 touch sensing lines 8. Each touch driving line Tx corresponds to the touch units 001 in one row, and each touch sensing line Rx corresponds to the touch units 001 in one column.

Figure 2:
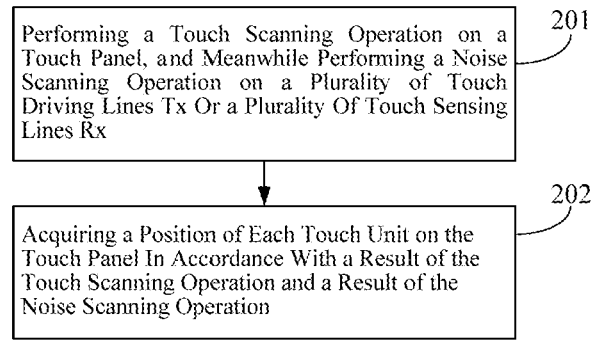
FIG. 2 is a flow chart of a noise scanning method according to one embodiment of the present disclosure.

The present disclosure further provides a noise scanning method for a touch display device. As shown in FIG. 2, the noise scanning method may include Step 201 of performing a touch scanning operation on a touch panel, and meanwhile performing a noise scanning operation on a plurality of touch driving lines Tx or a plurality of touch sensing lines Rx; and Step 202 of acquiring a position of each touch unit on the touch panel in accordance with a result of the touch scanning operation and a result of the noise scanning operation.

According to the noise scanning method in the embodiments of the present disclosure, the noise scanning operation is performed on the touch panel while performing the touch scanning operation. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Alternatively, each touch driving line Tx corresponds to the touch units in one row, each touch sensing line Rx corresponds to the touch units in one column, and each touch driving line Tx is coupled to the touch sensing lines Rx. The step of performing the touch scanning operation on the touch panel may include: inputting a first scanning signal to a first touch driving line Tx, the first touch driving line Tx being any one of the plurality of touch driving lines Tx; and acquiring a second scanning signal generated on a first touch sensing line Rx in accordance with the first scanning signal inputted to the first touch driving line Tx, the first touch sensing line Rx being any one of the plurality of touch sensing lines Rx.

The step of performing the noise scanning operation on the plurality of touch driving lines Tx may include in response to the first scanning signal inputted to the first touch driving line Tx, performing the noise scanning operation on the first touch driving line Tx, so as to acquire a noise of the first scanning signal.

Subsequent to the step of performing the noise scanning operation on the plurality of touch driving lines Tx, the noise scanning method may further include performing an additional noise scanning operation on the touch panel so as to acquire the other noise.

The touch display device is provided with a predetermined characteristic value of a Tx reference signal, and the noise scanning method may further include, in response to the first scanning signal inputted to the first touch driving line Tx, inputting the Tx reference signal to a second touch driving line Tx adjacent to the first touch driving line Tx. The step of performing the noise scanning operation on the first touch driving line Tx so as to acquire the noise of the first scanning signal may include acquiring a characteristic value of a signal on the second touch driving line Tx, calculating a difference between the characteristic value of the signal on the second touch driving line Tx and the characteristic value of the Tx reference signal, and taking the difference as the noise of the first scanning signal. It should be appreciated that, in the noise scanning operation on the first touch driving line Tx, the Tx reference signal is inputted to the second touch driving line Tx adjacent to the first touch driving line Tx, the signal on the second touch driving line Tx is collected, and then the difference between the characteristic value of the signal on the second touch driving line Tx and the characteristic value of the Tx reference signal is calculated and taken as the noise of the first scanning signal. In this way, the collection of the noise of the first scanning signal inputted to the first touch driving line Tx is completed.

Step 202 may include: subjecting the second scanning signal to first noise treatment in accordance with the noise of the first scanning signal, so as to acquire the second scanning signal after the first noise treatment; subjecting the second scanning signal after the first noise treatment to second noise treatment in accordance with the other noise, so as to acquire the second scanning signal after the second noise treatment; and acquiring a position of a first touch unit in accordance with the first scanning signal and the second scanning signal after the second noise treatment, the first touch unit corresponding to the first touch driving line Tx and the first touch sensing line Rx.

The step of performing the noise operation on the plurality of touch sensing lines Rx may include, in response to the acquisition of the second scanning signal, performing the noise scanning operation on the first touch sensing line Rx, so as to acquire a noise of the second scanning signal.

Figure 7:
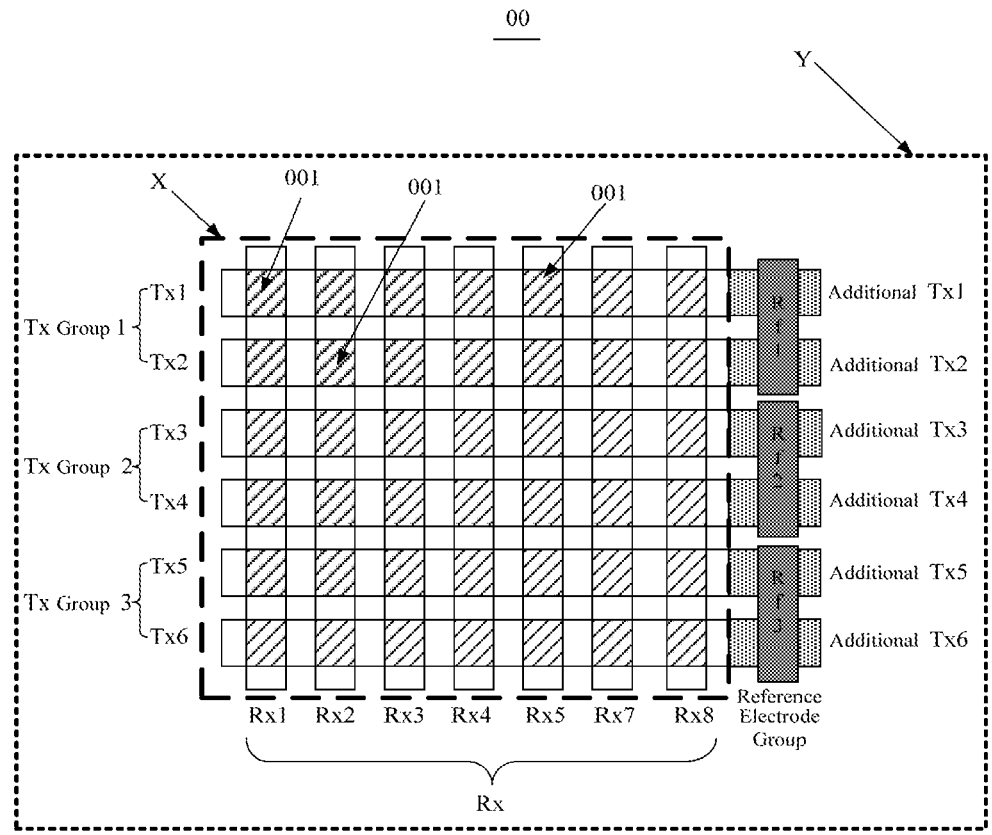
FIG. 7 is another topical, schematic view showing the touch panel according to one embodiment of the present disclosure.

In an alternative embodiment, as shown in FIG. 7, the touch panel is provided with a display region and a non-display region and includes a substrate. A reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1. The reference electrode group includes n reference electrodes, each reference electrode is coupled to the corresponding additional touch driving lines Tx, and the n Tx groups each correspond to the respective reference electrode. For example, a first Tx group includes the first touch driving line Tx corresponding to a first additional touch driving line Tx, a second Tx group is arranged adjacent to the first Tx group and corresponds to a second reference electrode. The touch display device is provided with a predetermined characteristic value of an Rx reference signal.

At this time, the noise scanning method may further include, in response to the first scanning signal inputted to the first touch driving line Tx, inputting the Tx reference signal to any one of the touch driving lines Tx in the second Tx group. The step of performing the noise scanning operation on the first touch sensing line Rx so as to acquire the noise of the second scanning signal may include acquiring a sensing signal on the second reference electrode, i.e., a noise signal of the second scanning signal, the sensing signal on the second reference electrode being generated in accordance with the Tx reference signal under the effect of a surrounding work environment; calculating a difference between a characteristic value of the signal on the second reference electrode and the characteristic value of the Rx reference signal; and taking the difference as an active signal received by the touch sensing line Rx. It should be appreciated that, in the noise scanning operation on the touch sensing line Rx, the Tx reference signal is inputted to any one of the touch driving lines Tx in the second Tx group, and the signal on the second reference electrode is collected as the noise signal of the second scanning signal. Then, the difference between the characteristic value of the signal on the second reference electrode and the characteristic value of the Rx reference signal is calculated as the active signal received by the touch sensing line Rx. In this way, the collection of the noise of the second scanning signal inputted to the touch sensing line Rx and the active data is completed.

Step 202 may further include: subjecting the second scanning signal to noise treatment in accordance with the noise of the second scanning signal, so as to acquire the second scanning signal after the noise treatment; and acquiring a position of a first touch unit in accordance with the first scanning signal and the second scanning signal after the noise treatment, the first touch unit corresponding to the first touch driving line Tx and the first touch sensing line Rx.

According to the noise scanning method in the embodiments of the present disclosure, the noise scanning operation is performed on the touch panel while performing the touch scanning operation. During the noise scanning operation, all the noises generated during the period of the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 3:
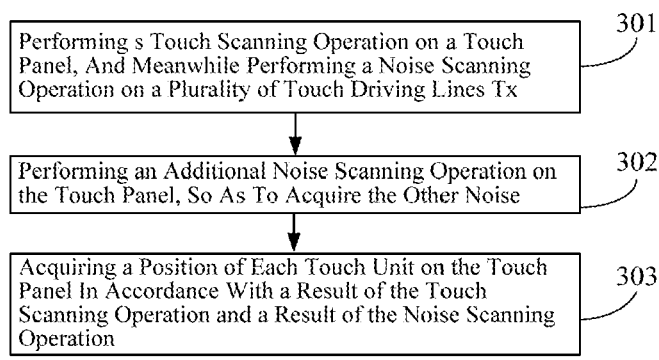
FIG. 3 is another flow chart of the noise scanning method according to one embodiment of the present disclosure.

The present disclosure further provides in some embodiments another noise scanning method for a touch display device. As shown in FIG. 3, the noise scanning method may include the following steps.

Step 301: performing a touch scanning operation on the touch panel, and meanwhile performing a noise scanning operation, for example, on a plurality of touch driving lines Tx.

For example, each touch driving line Tx corresponds to the touch units in a row, each touch sensing line Rx corresponds to the touch units in a column, and each touch driving line Tx is coupled to the touch sensing lines Rx. To be specific, the coupling of each touch driving line Tx to the touch sensing lines Rx refers to that there is close cooperation and mutual influence between each touch driving line Tx and the touch sensing lines Rx, and the corresponding second scanning signal may be generated by the touch sensing line Rx in response to a first scanning signal inputted to the touch driving line Tx. The first scanning signal may be inputted to the first touch driving line Rx which is any one of the touch driving lines Tx. Because the touch driving line Tx is coupled to the touch sensing lines Rx, the corresponding signals may be generated by the plurality of the touch sensing lines Rx in accordance with the signal inputted to the touch driving line Tx. For example, after the first scanning signal is inputted to the first touch driving line Tx, a second scanning signal may be acquired. This second scanning signal is generated by a first touch sensing line Rx in accordance with the first scanning signal inputted to the first touch driving line Tx, and the first touch sensing line Rx is any one of the touch sensing lines Rx.

Further, the touch display device may be provided with a predetermined characteristic value of a Tx reference signal. The characteristic value of the Tx reference signal is acquired after the Tx reference signal is inputted to the touch driving line Tx in a standard noiseless environment. The noise scanning operation on the first touch driving line Tx may be performed while inputting the first scanning signal to the first touch driving line Tx, so as to acquire the noise of the first scanning signal. The noise signals on the two adjacent touch driving lines Tx may be considered as identical to each other, so the noise of the signal inputted to second touch driving line Tx adjacent to the first touch driving line Tx may be acquired and taken as the noise of the signal inputted to the first touch driving line Tx. To be specific, in Step 301, the Tx reference signal may be inputted to the second touch driving line Tx adjacent to the first touch driving line Tx while inputting the first scanning signal to the first touch driving line Tx. For example, as shown in FIG. 1, the Tx reference signal may be inputted to the second touch driving line Tx2 adjacent to the first touch driving line Tx1 while inputting the first scanning signal to the first touch driving line Tx1, and the Tx reference signal may be inputted to the first touch driving line Tx1 or a third touch driving line Tx3 adjacent to the second touch driving line Tx2 while inputting the first scanning signal to the second touch driving line Tx2. Because the first touch driving line Tx is adjacent to the second touch driving line Tx, the noise generated by the other signal on the first touch driving line Tx may be considered to be identical to that generated by the other signal on the second touch driving line Tx. Then, the characteristic value of the signal on the second touch driving line Tx may be acquired, and the difference between the characteristic value of the signal on the second touch driving line Tx and the characteristic value of the Tx reference signal may be calculated as the noise of the signal inputted to the second touch driving line Tx. The noise of the signal inputted to the second touch driving line Tx may be taken as the noise of the first scanning signal.

It should be appreciated that, during the noise scanning operation on the first touch driving line Tx, the Tx reference signal is inputted to the second touch driving line Tx adjacent to the first touch driving line Tx, the signal on the second touch driving line Tx is collected, and then the difference between the characteristic value of the signal on the second touch driving line Tx and the characteristic value of the Tx reference signal is calculated and taken as the noise of the first scanning signal. In this way, the collection of the noise of the first scanning signal on the first touch driving line Tx is completed.

During the actual application, the touch scanning operation and the display scanning operation are performed simultaneously, and in the case that the touch scanning operation is performed on the in-cell touch panel, the noise scanning operation may be performed. To be specific, the noise scanning operation may be performed on the plurality of touch driving lines Tx, so as to acquire the noise generated by the display scanning signal on the plurality of touch driving lines Tx.

Step 302: performing an additional noise scanning operation on the touch panel, so as to acquire the other noise.

To be specific, a reference sensing signal may be stored in the touch display device. This reference sensing signal is generated by the touch sensing line Rx in response to a testing signal inputted to the touch driving line Tx in a standard noiseless environment. After the touch scanning operation and the noise scanning operation on the touch display device, the additional noise scanning operation may be performed, so as to acquire the other noise generated during the touch scanning operation (i.e., the noise generated on the second scanning signal which is generated on the touch sensing line Rx in response to signals inputted to the touch driving line Tx). For example, the testing signal may be inputted to the plurality touch driving lines Tx, so as to acquire the sensing signal generated by the touch sensing lines Rx in response to the test signal. Then, a difference between the sensing signal and the reference sensing signal is calculated and taken as the other noise. It should be appreciated that, the additional noise scanning operation in Step 302 may refer to that known in the related art.

Step 303: acquiring a position of each touch unit on the touch panel in accordance with a result of the touch scanning operation and a result of the noise scanning operation.

For example, the second scanning signal may be subjected to first noise treatment in accordance with the noise of the first scanning signal corresponding to the second scanning signal acquired in Step 301, so as to remove the noise from the second scanning signal, thereby to acquire the second scanning signal after the first noise treatment. It should be appreciated that, the noise treatment may refer to that known in the related art, and thus will not be particularly defined herein. Then, the second scanning signal after the first noise treatment may be subjected to second noise treatment in accordance with the other noise corresponding to the second scanning signal, so as to acquire the second scanning signal after the second noise treatment. To be specific, in Step 302, the additional noise scanning operation is performed on the touch panel to acquire the other noise on each touch sensing line Rx (i.e., the noise generated on the second scanning signal during the second scanning signal is generated on the first touch sensing line Rx), so the second noise treatment may be performed on the second scanning signal after the first noise treatment in accordance with the other noise corresponding to the second scanning signal, so as to remove the other noise from the second scanning signal, thereby to acquire the second scanning signal after the second noise treatment.

Figure 4:
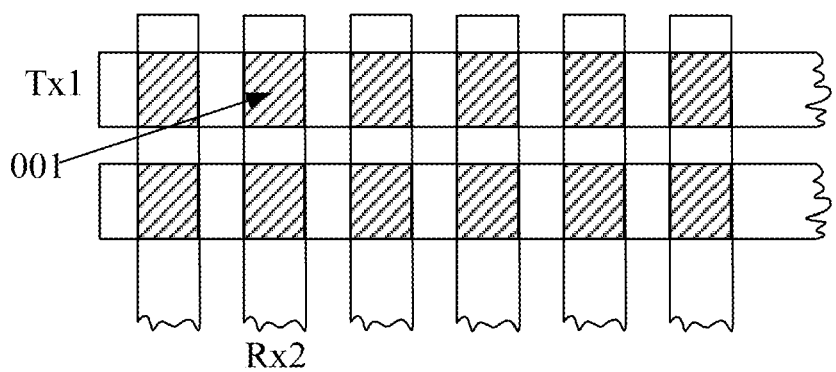
FIG. 4 is a topical, schematic view showing the touch panel according to one embodiment of the present disclosure.

Further, a position of a first touch unit on the touch panel corresponding to the first touch driving line Tx and the first touch sensing line Rx may be acquired in accordance with the first scanning signal and the second scanning signal after the second noise treatment. As shown in FIG. 4, Tx1 represents the first touch driving line Tx and Rx2 represents the first touch sensing line Rx. The first scanning signal is inputted to the first touch driving line Tx1, and the second scanning signal may be generated on the first touch sensing line Rx2 in accordance with the first scanning signal on the first touch driving line Tx1. The second scanning signal is subjected sequentially to the first noise treatment and the second noise treatment, so as to acquire the second scanning signal after the second noise treatment. Then, the position of the first touch unit corresponding to the first touch driving line Tx1 and the first touch sensing line Rx2 may be determined in accordance with the first scanning signal and the second scanning line after the second noise treatment, i.e., a touch unit 001 in a first row and in a second column may be determined as the first touch unit on the touch panel 00.

Figure 5:
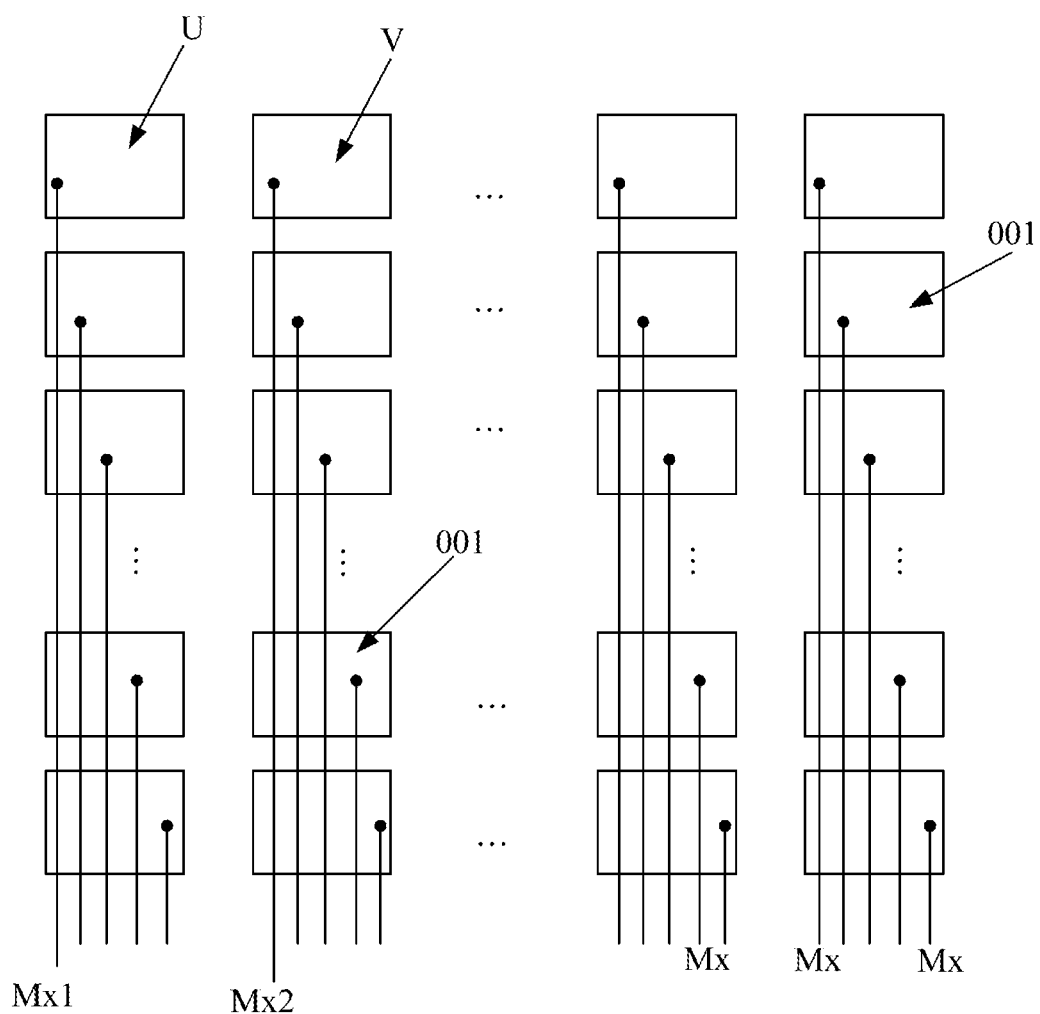
FIG. 5 is yet another flow chart of the noise scanning method according to one embodiment of the present disclosure.

Further, as shown in FIG. 5, in the case that the touch panel 00 is a self-capacitive touch panel, it is provided with a plurality of touch units 001 arranged in an array form, each touch unit 001 corresponds to a position on the touch panel 00, and a touch line Mx is provided for each touch unit 001. For example, a touch unit U in a first row and in a first column corresponds to a touch line Mx1, and a touch unit V in a first row and in a second column corresponds to a touch line Mx2. A reference input signal may be inputted to the touch line Mx2 of the touch unit V adjacent to the touch unit U while performing the touch scanning operation on the touch unit U, and a characteristic value of a signal inputted to the touch line Mx2 may be acquired. Then, A difference between the characteristic value of the signal inputted to the touch line Mx2 and a characteristic value of a reference output signal may be calculated and taken as the noise on the touch line Mx1 corresponding to the touch unit U. During the touch scanning operation on the touch unit U, the first scanning signal is inputted to the touch line Mx1 corresponding to the touch unit U, and the second scanning signal is generated by the touch line Mx1 in accordance with the first scanning signal. Then, the noise treatment is performed on the second scanning signal in accordance with the noise on the touch line Mx1, so as to the second scanning signal after the noise treatment. And then, a position of the touch unit U on the touch panel 00 may be determined in accordance with the first scanning signal and the second scanning signal after the noise treatment. It should be appreciated that, the determination of the other touch units 001 on the touch panel 00 may refer to the determination of the touch unit U, and thus will not be particularly defined herein.

According to the noise scanning method in the embodiments of the present disclosure, the noise scanning operation is performed on the touch panel while performing the touch scanning operation. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 6:
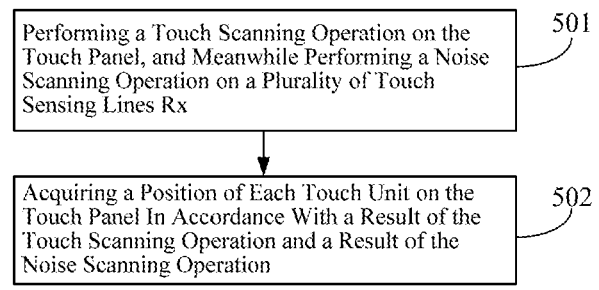
FIG. 6 is another schematic view showing the touch panel according to one embodiment of the present disclosure.

The present disclosure further provides in some embodiments yet another noise scanning method for a touch display device. As shown in FIG. 6, the noise scanning method may include the following steps.

Step 501: performing a touch scanning operation on the touch panel, and meanwhile performing a noise scanning operation on a plurality of touch sensing lines Rx.

Each touch driving line Tx corresponds to the touch units in a row, each touch sensing line Rx corresponds to the touch units in a column, and each touch driving line Tx is coupled to the touch sensing lines Rx. To be specific, the coupling of each touch driving line Tx to the touch sensing lines Rx refers to that there is close cooperation and mutual influence between each touch driving line Tx and the touch sensing lines Rx, and the corresponding second scanning signal may be generated by the touch sensing line Rx in response to a first scanning signal inputted to the touch driving line Tx. The first scanning signal may be inputted to the first touch driving line Rx which is any one of the touch driving lines Tx. Because the touch driving line Tx is coupled to the touch sensing lines Rx, the corresponding signals may be generated by the touch sensing lines Rx in accordance with the signal on the touch driving line Tx. For example, after the first scanning signal is inputted to the first touch driving line Tx, a second scanning signal may be acquired. This second scanning signal is generated on a first touch sensing line Rx in accordance with the first scanning signal on the first touch driving line Tx, and the first touch sensing line Rx is any one of the touch sensing lines Rx.

Further, the substrate is provided with a reference electrode group arranged at a position corresponding to a non-display region and parallel to the touch sensing lines Rx. A plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1. The reference electrode group includes n reference electrodes, each reference electrode is coupled to the corresponding additional touch driving lines Tx, and the n Tx groups each correspond to the respective reference electrode. A first Tx group includes the first touch driving line Tx corresponding to a first additional touch driving line Tx, a second Tx group is arranged adjacent to the first Tx group and corresponds to a second reference electrode, and the touch display device is provided with a predetermined characteristic value of an Rx reference signal. The characteristic value of the Rx reference signal is generated on the first touch sensing line Rx after the Tx reference signal is inputted to the first touch driving line Tx in a standard noiseless environment.

In response to the first scanning signal inputted to the first touch driving line Tx, the Tx reference signal may be inputted to any one of the touch driving lines Tx in the second Tx group. In response to the acquisition of the second scanning signal, a noise scanning operation may be performed on the first touch sensing line Rx, so as to acquire the noise of the second scanning signal. To be specific, a signal on the second reference electrode may be acquired and taken as the noise signal of the second scanning signal. The signal on the second reference electrode is a sensing signal generated on the second reference electrode in accordance with the Tx reference signal in a surrounding work environment. After the acquisition of the signal on the second reference electrode, its characteristic value may be acquired, and then a difference between the characteristic value of the signal on the second reference electrode and a characteristic value of the signal on the touch sensing line Rx may be calculated and taken as an active signal received by the touch sensing line Rx.

For example, as shown in FIG. 7, the present disclosure provides in some embodiments another touch panel 00 which includes a touch panel 00. The touch panel 00 may be provided with a display region X and a non-display region Y which is the region rather than the display region X, and include a substrate (not shown). In FIG. 7, there are six touch driving lines Tx, i.e., Tx1, Tx2, Tx3, Tx4, Tx5 and Tx6. Correspondingly, six additional touch driving lines Tx are arranged on the substrate at a position corresponding to the non-display region Y. The six touch driving lines Tx are connected to the respective additional touch driving lines Tx, and divided into three Tx groups. To be specific, a Tx group 1 includes Tx1 and Tx2, a Tx group 2 includes Tx3 and Tx4, and a Tx group 3 includes Tx5 and Tx6. A reference electrode group is arranged on the substrate at a position corresponding to the non-display region Y, and it includes three reference electrodes Rf, i.e., Rf1, Rf2 and Rf3. The reference electrode group is arranged parallel to the touch sensing lines Rx, and a projection of the reference electrode group onto the substrate intersects the additional touch driving lines Tx. Each reference electrode Rf is coupled to the corresponding additional touch driving lines Tx, and the n Tx groups correspond to the respective reference electrodes Rf. To be specific, Rf1 corresponds to the Tx group 1, Rf2 corresponds to the Tx group 2, and Rf3 corresponds to the Tx group 3.

The Tx group 1 includes the first touch driving line Tx1 corresponding to the additional touch driving line Tx1, the Tx group 2 is adjacent to the Tx group 1, and Rf2 corresponds to the Tx group 2. During the touch scanning operation on the first touch driving line Tx1, the first scanning signal may be inputted to the first touch driving line Tx1, and the second scanning signal may be generated on the touch sensing line Rx1 in accordance with the first scanning signal. The second scanning signal may be acquired after the generation thereof. Further, because the Tx group 1 is adjacent to the Tx group 2, the noise generated on the touch sensing line Rx in accordance with the first scanning signal on any one of the touch driving lines Tx in the Tx group 1 is identical to that generated on the touch sensing line Rx in accordance with the first scanning signal on any one of the touch driving lines Tx in the Tx group 2. Hence, in response to the first scanning signal inputted to the first touch driving line Tx1, the Tx reference signal may be inputted to Tx3 in the Tx group 2. In response to the acquisition of the second scanning signal generated on Rx1, the noise scanning operation may be performed on Rx1, so as to acquire the noise of the second scanning signal. To be specific, a signal generated on Rf2 in accordance with the Tx reference signal on Tx3 may be acquired, and this signal is just the noise signal of the second scanning signal. After the acquisition of the signal generated on Rf2, its characteristic value may be acquired, and then a difference between the characteristic value of the signal generated on Rf2 and the characteristic value of the Rx reference signal may be calculated and taken as an active signal received by the touch sensing line Rx.

It should be appreciated that, during the noise scanning operation on the first touch sensing line Rx, the Tx reference signal is inputted to any one of the touch driving lines Tx in the second Tx group, the signal on the second reference electrode is collected, and the difference between the characteristic value of the signal on the second reference electrode and the characteristic value of the Rx reference signal is calculated and taken as the noise of the second scanning signal. In this way, the collection of the noise of the scanning signal on the first touch sensing line Rx is completed.

Step 502: acquiring a position of each touch unit on the touch panel in accordance with a result of the touch scanning operation and a result of the noise scanning operation.

The second scanning signal is subjected to noise treatment in accordance with the noise of the second scanning signal, so as to acquire the second scanning signal after the noise treatment. To be specific, the noise of the second scanning signal has been acquired in Step 501 after the noise scanning operation on the touch panel, so the noise treatment may be performed on the second scanning signal in accordance with the noise acquired in Step 501, so as to remove all the noises (including the noise generated by the first scanning signal and the noise generated on the second scanning signal during the second scanning signal is generated on the first touch sensing line Rx in accordance with the first touch driving line Tx) from the second scanning signal, thereby to acquire the second scanning signal after the noise treatment.

Further, a position of a first touch unit corresponding to the first touch driving line Tx and the first touch sensing line Rx may be determined in accordance with the first scanning signal and the second scanning signal after the noise treatment. As shown in FIG. 4, Tx1 represents the first touch driving line Tx and Rx2 represents the first touch sensing line Rx. The first scanning signal is inputted to the first touch driving line Tx1, and the second scanning signal may be generated on the first touch sensing line Rx2 in accordance with the first scanning signal on the first touch driving line Tx1. The second scanning signal is subjected to the noise treatment, so as to acquire the second scanning signal after the noise treatment. Then, the position of the first touch unit corresponding to the first touch driving line Tx1 and the first touch sensing line Rx2 may be determined in accordance with the first scanning signal and the second scanning line after the noise treatment, i.e., a touch unit 001 in a first row and in a second column may be determined as the first touch unit on the touch panel 00.

Alternatively, prior to Step 502, the noise may be acquired during the noise scanning operation in a way identical to the above-mentioned Steps 301 and 302. In Step 502, the noise treatment may be performed in accordance with the noise acquired in Step 501 and the noise acquired in a way identical to the above-mentioned Steps 301 and 302. To be specific, the noise treatment may be performed at first, as that in Step 303, in accordance with the noise acquired during the noise scanning operation in a way identical to Steps 301 and 302, and then further noise treatment may be performed in accordance with the noise acquired in Step 501, so as to acquire the position of the touch unit on the touch panel. Alternatively, the noise treatment may be performed at first in accordance with the noise acquired in Step 501, and then the further noise treatment may be performed in accordance with the noise acquired during the noise scanning operation in a way identical to Steps 301 and 302, so as to acquire the position of the touch unit on the touch panel.

Further, as shown in FIG. 5, in the case that the touch panel 00 is a self-capacitive touch panel, it is provided with a plurality of touch units 001 arranged in an array form, each touch unit 001 corresponds to a position on the touch panel 00, and a touch line Mx is provided for each touch unit 001. For example, a touch unit U in a first row and in a first column corresponds to a touch line Mx1, and a touch unit V in a first row and in a second column corresponds to a touch line Mx2. A reference input signal may be inputted to the touch line Mx2 of the touch unit V adjacent to the touch unit U while performing the touch scanning operation on the touch unit U, and a characteristic value of a signal on the touch line Mx2 may be acquired. Then, A difference between the characteristic value of the signal on the touch line Mx2 and a characteristic value of a reference output signal may be calculated and taken as the noise on the touch line Mx1 corresponding to the touch unit U. During the touch scanning operation on the touch unit U, the first scanning signal is inputted to the touch line Mx1 corresponding to the touch unit U, and the second scanning signal is generated on the touch line Mx1 in accordance with the first scanning signal. Then, the noise treatment is performed on the second scanning signal in accordance with the noise on the touch line Mx1, so as to the second scanning signal after the noise treatment. And then, a position of the touch unit U on the touch panel 00 may be determined in accordance with the first scanning signal and the second scanning signal after the noise treatment. It should be appreciated that, the determination of the other touch units 001 on the touch panel 00 may refer to the determination of the touch unit U, and thus will not be particularly defined herein.

According to the noise scanning method in the embodiments of the present disclosure, the noise scanning operation is performed on the touch panel while performing the touch scanning operation. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 8:
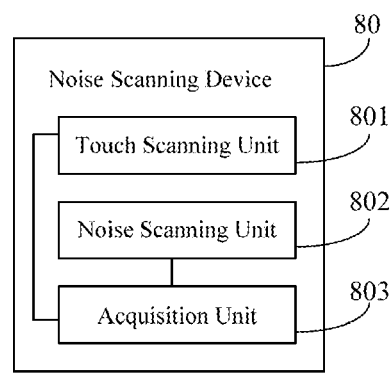
FIG. 8 is a schematic view showing a noise scanning device according to one embodiment of the present disclosure.

As shown in FIG. 8, the present disclosure provides in some embodiments a noise scanning device 80. The noise scanning device 80 may be a touch display device, and the noise scanning device 80 may include a touch panel. The touch panel may include a plurality of touch units arranged in an array form, a plurality of touch driving lines Tx arranged in an array form, and a plurality of touch sensing lines Rx arranged in an array form, and each touch driving line Tx is arranged perpendicular to each touch sensing line Rx. The noise scanning device 80 may include: a touch scanning unit 801 configured to perform a touch scanning operation on the touch panel; a noise scanning unit 802 configured to perform a noise scanning operation, for example, on the plurality of touch driving lines Tx or the plurality of touch sensing lines Rx, while the touch scanning operation is performed by the touch scanning unit; and an acquisition unit 803 configured to acquire a position of each touch unit on the touch panel in accordance with a result of the touch scanning operation and a result of the noise scanning operation.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Alternatively, each touch driving line Tx corresponds to the touch units in a row, each touch sensing line Rx corresponds to the touch units in a column, and each touch driving line Tx is coupled to the touch sensing lines Rx. The touch scanning unit 801 is further configured to: input a first scanning signal to a first touch driving line Tx, the first touch driving line Tx being any one of the plurality of touch driving lines Tx; and acquire a second scanning signal generated by a first touch sensing line Rx in accordance with the first scanning signal on the first touch driving line Tx, the first touch sensing line Rx being any one of the plurality of touch sensing lines Rx.

The noise scanning unit 802 is further configured to, in response to the first scanning signal inputted to the first touch driving line Tx, perform the noise scanning operation on the first touch driving line Tx, so as to acquire a noise of the first scanning signal.

The noise scanning unit 802 is further configured to, in response to the acquisition of the second scanning signal, perform the noise scanning operation on the first touch sensing line Rx, so as to acquire a noise of the second scanning signal.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 9:
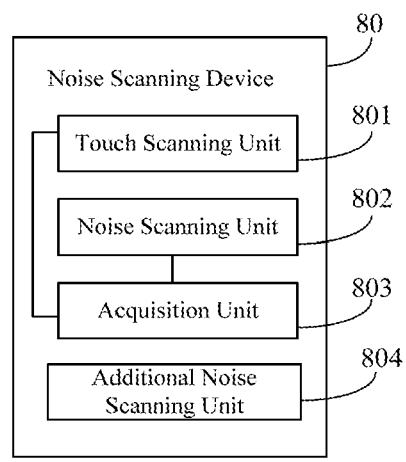
FIG. 9 is another schematic view showing the noise scanning device according to one embodiment of the present disclosure.

As shown in FIG. 9, the present disclosure further provides in some embodiments another noise scanning device 80, which may include: a touch scanning unit 801 configured to perform a touch scanning operation on the touch panel; a noise scanning unit 802 configured to perform a noise scanning operation on the plurality of touch driving lines Tx or the plurality of touch sensing lines Rx while the touch scanning operation is performed by the touch scanning unit; an acquisition unit 803 configured to acquire a position of each touch unit on the touch panel in accordance with a result of the touch scanning operation and a result of the noise scanning operation; and an additional noise scanning unit 804 configured to perform an additional noise scanning operation on the touch panel, so as to acquire the other noise.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 10:
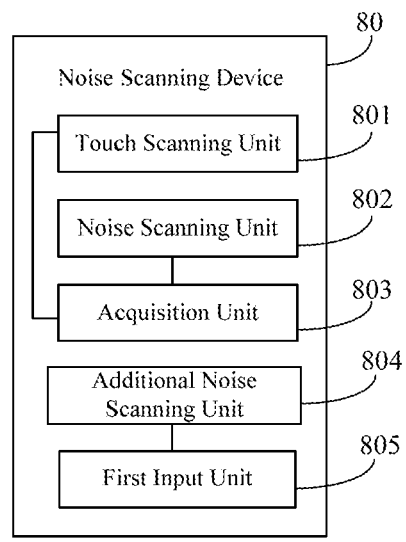
FIG. 10 is yet another schematic view showing the noise scanning device according to one embodiment of the present disclosure.

As shown in FIG. 10, the present disclosure further provides in some embodiments another noise scanning device 80, which may include: a touch scanning unit 801 configured to perform a touch scanning operation on the touch panel; a noise scanning unit 802 configured to perform a noise scanning operation on the plurality of touch driving lines Tx or the plurality of touch sensing lines Rx while the touch scanning operation is performed by the touch scanning unit; an acquisition unit 803 configured to acquire a position of each touch unit on the touch panel in accordance with a result of the touch scanning operation and a result of the noise scanning operation; an additional noise scanning unit 804 configured to perform an additional noise scanning operation on the touch panel, so as to acquire the other noise; and a first input unit 805 configured to, in response to the first scanning signal inputted to the first touch driving line Tx, input a Tx reference signal to a second touch driving line Tx adjacent to the first touch driving line Tx.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

The noise scanning unit 802 is further configured to acquire a characteristic value of a signal inputted to the second touch driving line Tx, calculate a difference between the characteristic value of the signal on the second touch driving line Tx and the characteristic value of the Tx reference signal, and take the difference as the noise of the first scanning signal.

The acquisition unit 803 is further configured to: perform first noise treatment on the second scanning signal in accordance with the noise of the first scanning signal, so as to acquire the second scanning signal after the first noise treatment; perform second noise treatment on the second scanning signal after the first noise treatment in accordance with the other noise, so as to acquire the second scanning signal after the second noise treatment; and acquire a position of a first touch unit in accordance with the first scanning signal and the second scanning signal after the second noise treatment, the first touch unit corresponding to the first touch driving line Tx and the first touch sensing line Rx.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 11:
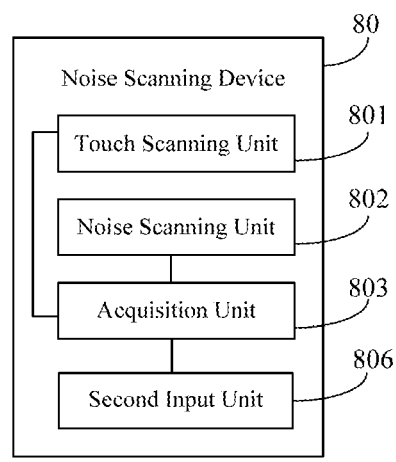
FIG. 11 is still yet another schematic view showing the noise scanning device according to one embodiment of the present disclosure.

As shown in FIG. 11, the present disclosure further provides in some embodiments another noise scanning device 80, which may include: a touch scanning unit 801 configured to perform a touch scanning operation on the touch panel; a noise scanning unit 802 configured to perform a noise scanning operation on the plurality of touch driving lines Tx or the plurality of touch sensing lines Rx while the touch scanning operation is performed by the touch scanning unit; an acquisition unit 803 configured to acquire a position of each touch unit on the touch panel in accordance with a result of the touch scanning operation and a result of the noise scanning operation; and a second input unit 806 configured to, in response to the first scanning signal inputted to the first touch driving line Tx, input a Tx reference signal to any one of the touch driving lines Tx in a second Tx group.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

The noise scanning device may be a touch display device provided with a touch panel which includes a display region and a non-display region and includes a substrate, a reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1.

The reference electrode group includes n reference electrodes, each reference electrode is coupled to the corresponding additional touch driving lines Tx, and the n Tx groups each correspond to the respective reference electrode. A first Tx group includes the first touch driving line Tx corresponding to a first additional touch driving line Tx, a second Tx group is arranged adjacent to the first Tx group and corresponds to a second reference electrode, and the touch display device is provided with a predetermined characteristic value of an Rx reference signal.

The noise scanning unit 802 is further configured to: acquire a signal on the second reference electrode and generated in accordance with the Tx reference signal, the signal being a noise signal of the second scanning signal; calculating a difference between a characteristic value of the signal on the second reference electrode and the characteristic value of the Rx reference signal; and take the difference as an active signal received by the touch sensing line Rx.

The acquisition unit 803 is further configured to: perform noise treatment on the second scanning signal in accordance with the noise of the second scanning signal, so as to acquire the second scanning signal after the noise treatment; and acquire a position of a first touch unit in accordance with the first scanning signal and the second scanning signal after the noise treatment, the first touch unit corresponding to the first touch driving line Tx and the first touch sensing line Rx.

According to the noise scanning device in the embodiments of the present disclosure, the noise scanning operation is performed on the touch panel by the noise scanning unit while performing the touch scanning operation by the touch scanning unit. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

Figure 12:
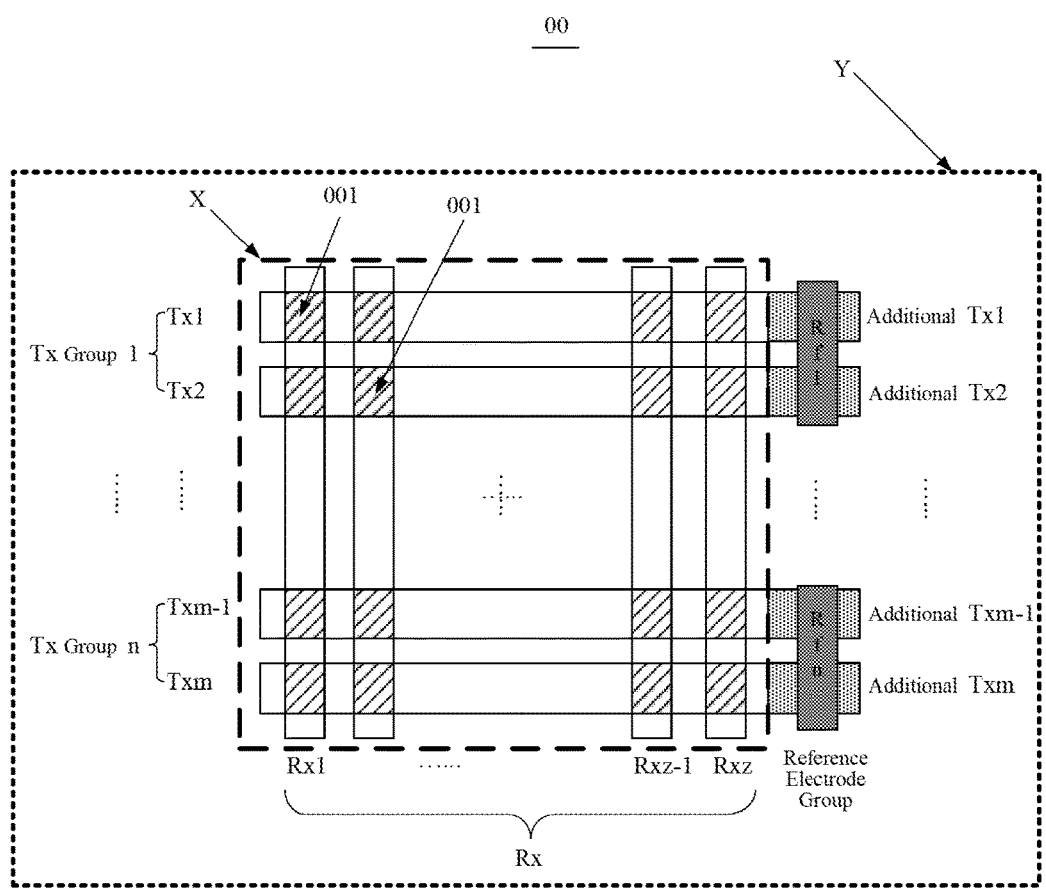
FIG. 12 is yet another schematic view showing the touch panel according to one embodiment of the present disclosure.

As shown in FIG. 12, the present disclosure provides in some embodiments yet another touch panel 00 for a touch display device (not shown). The touch display device may be that in FIG. 8 or 11. The touch panel 00 may be provided with a display region X and a non-display region Y, and it may include a substrate (not shown).

A reference electrode group is arranged in one column on the substrate at a position corresponding to the non-display region Y and parallel to touch sensing lines Rx, m touch driving lines Tx and z touch sensing lines Rx are arranged in an array form on the substrate at a position corresponding to the display region X. Each touch driving line Tx corresponds to touch units 001 in one row, and each touch sensing line Rx corresponds to the touch units 001 in one column. M additional touch driving lines Tx are arranged on the substrate at a position corresponding to the reference electrode group, the m touch driving lines Tx are connected to the respective m additional touch driving lines Tx, and the m touch driving lines Tx are divided into n Tx groups, where n is an integer greater than 1. The reference electrode group includes n reference electrode Rf, each reference electrode Rf is coupled to the corresponding additional touch driving lines Tx, and the n Tx groups correspond to the respective reference electrodes Rf.

For example, as shown in FIG. 7, there are six touch driving lines Tx, i.e., Tx1, Tx2, Tx3, Tx4, Tx5 and Tx6. Correspondingly, six additional touch driving lines Tx are arranged transversely on the substrate at a position corresponding to the non-display region Y. The six touch driving lines Tx are connected to the respective additional touch driving lines Tx, and divided into three Tx groups. To be specific, a Tx group 1 includes Tx1 and Tx2, a Tx group 2 includes Tx3 and Tx4, and a Tx group 3 includes Tx5 and Tx6. A reference electrode group is arranged on the substrate at a position corresponding to the non-display region Y, and it includes three reference electrodes Rf, i.e., Rf1, Rf2 and Rf3. The reference electrode group is arranged parallel to the touch sensing lines Rx, and a projection of the reference electrode group onto the substrate intersects the additional touch driving lines Tx. Each reference electrode Rf is coupled to corresponding additional touch driving lines Tx, and the n Tx groups correspond to the respective reference electrodes Rf. To be specific, Rf1 corresponds to the Tx group 1, Rf2 corresponds to the Tx group 2, and Rf3 corresponds to the Tx group 3.

According to the touch panel in the embodiments of the present disclosure, the noise scanning operation is performed on the touch panel by the touch scanning device while performing the touch scanning operation. During the noise scanning operation, all the noises generated in the touch scanning operation may be acquired, i.e., in the case that a display scanning operation is performed by the in-cell touch panel while performing the touch scanning operation, an influence value of a display scanning signal on the touch scanning operation may be acquired through the noise scanning operation. As a result, it is able to accurately acquire the position of each touch unit on the touch panel, thereby to improve the touch scanning effect.

The above-mentioned embodiments may be combined in any form, which will not be particularly defined herein.

The above are merely the preferred embodiments of the present disclosure. A person skilled in the art may make further modifications and improvements without departing from the spirit and principle of the present disclosure, and these modifications and improvements shall also fall within the scope of the present disclosure.

What is claimed is:

1. A noise scanning method for a touch display device, the touch display device comprising a touch panel, the touch panel comprising a plurality of touch units arranged in an array form, a plurality of touch driving lines Tx arranged in an array form, and a plurality of touch sensing lines Rx arranged in an array form, each touch driving line Tx being arranged perpendicular to each touch sensing line Rx, the noise scanning method comprising steps of:

performing a touch scanning operation on the touch panel;

performing a noise scanning operation on the plurality of touch driving lines Tx or the plurality of touch sensing lines Rx while performing the touch scanning operation; and acquiring a position of each touch unit on the touch panel in accordance with a result of the touch scanning operation and a result of the noise scanning operation, wherein each touch driving line Tx corresponds to the touch units in a row, each touch sensing line Rx corresponds to the touch units in a column, and each touch driving line Tx is coupled to the touch sensing lines Rx, and wherein the step of performing the touch scanning operation on the touch panel comprises:

inputting a first scanning signal to a first touch driving line Tx, the first touch driving line Tx being any one of the plurality of touch driving lines Tx; and acquiring a second scanning signal generated on a first touch sensing line Rx in accordance with the first scanning signal on the first touch driving line Tx, the first touch sensing line Rx being any one of the plurality of touch sensing lines Rx, wherein the step of performing the noise scanning operation on the plurality of touch driving lines Tx comprises:

in response to the first scanning signal inputted to the first touch driving line Tx, performing the noise scanning operation on the first touch driving line Tx, so as to acquire a noise of the first scanning signal, and subsequent to the step of performing the noise scanning operation on the plurality of touch driving lines Tx, the noise scanning method further comprises performing an additional noise scanning operation on the touch panel so as to acquire the other noise, wherein the touch display device is provided with a predetermined characteristic value of a Tx reference signal, the noise scanning method further comprises, in response to the first scanning signal inputted to the first touch driving line Tx, inputting the Tx reference signal to a second touch driving line Tx adjacent to the first touch driving line Tx, and the step of performing the noise scanning operation on the first touch driving line Tx so as to acquire the noise of the first scanning signal comprises acquiring a characteristic value of a signal on the second touch driving line Tx, calculating a difference between the characteristic value of the signal on the second touch driving line Tx and the characteristic value of the Tx reference signal, and taking the difference as the noise of the first scanning signal.

2. The noise scanning method according to claim 1, wherein the step of acquiring the position of each touch unit on the touch panel in accordance with the result of the touch scanning operation and the result of the noise scanning operation comprises:

subjecting the second scanning signal to first noise treatment in accordance with the noise of the first scanning signal, so as to acquire the second scanning signal after the first noise treatment;

subjecting the second scanning signal after the first noise treatment to second noise treatment in accordance with the other noise, so as to acquire the second scanning signal after the second noise treatment; and acquiring a position of a first touch unit in accordance with the first scanning signal and the second scanning signal after the second noise treatment, the first touch unit corresponding to the first touch driving line Tx and the first touch sensing line Rx.

3. The noise scanning method according to claim 1, wherein the step of performing the noise operation on the plurality of touch sensing lines Rx comprises, in response to the acquisition of the second scanning signal, performing the noise scanning operation on the first touch sensing line Rx, so as to acquire a noise of the second scanning signal.

4. The noise scanning method according to claim 3, wherein the touch panel is provided with a display region and a non-display region and comprises a substrate, a reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1;

the reference electrode group comprises n reference electrodes, each reference electrode is coupled to corresponding additional touch driving lines Tx, the n Tx groups each correspond to the respective reference electrode, a first Tx group comprises the first touch driving line Tx corresponding to a first additional touch driving line Tx, a second Tx group is arranged adjacent to the first Tx group and corresponds to a second reference electrode, and the touch display device is provided with a predetermined characteristic value of a Rx reference signal;

the noise scanning method further comprises, in response to the first scanning signal inputted to the first touch driving line Tx, inputting the Tx reference signal to any one of the touch driving lines Tx in the second Tx group; and the step of performing the noise scanning operation on the first touch sensing line Rx so as to acquire the noise of the second scanning signal comprises acquiring a signal on the second reference electrode, wherein the signal on the second reference electrode is generated in accordance with the Tx reference signal and is the noise of the second scanning signal.

5. The noise scanning method according to claim 4, wherein the step of acquiring the position of each touch unit on the touch panel in accordance with the result of the touch scanning operation and the result of the noise scanning operation comprises:

subjecting the second scanning signal to noise treatment in accordance with the noise of the second scanning signal, so as to acquire the second scanning signal after the noise treatment; and acquiring a position of a first touch unit in accordance with the first scanning signal and the second scanning signal after the noise treatment, the first touch unit corresponding to the first touch driving line Tx and the first touch sensing line Rx.

6. A noise scanning device for a touch display device, the touch display device comprising a touch panel, the touch panel comprising a plurality of touch units arranged in an array form, a plurality of touch driving lines Tx arranged in an array form, and a plurality of touch sensing lines Rx arranged in an array form, each touch driving line Tx being arranged perpendicular to each touch sensing line Rx, the noise scanning device comprising:
 a touch scanning unit configured to perform a touch scanning operation on the touch panel;
 a noise scanning unit configured to perform a noise scanning operation on the plurality of touch driving lines Tx or the plurality of touch sensing lines Rx while the touch scanning operation is performed by the touch scanning unit; and
 an acquisition unit configured to acquire a position of each touch unit on the touch panel in accordance with a result of the touch scanning operation and a result of the noise scanning operation,
 wherein each touch driving line Tx corresponds to the touch units in a row, each touch sensing line Rx corresponds to the touch units in a column, and each touch driving line Tx is coupled to the touch sensing lines Rx,
 wherein the touch scanning unit is further configured to:
 input a first scanning signal to a first touch driving line Tx, the first touch driving line Tx being any one of the plurality of touch driving lines Tx; and
 acquire a second scanning signal generated on a first touch sensing line Rx in accordance with the first scanning signal on the first touch driving line Tx, the first touch sensing line Rx being any one of the plurality of touch sensing lines Rx,
 wherein the noise scanning unit is further configured to, in response to the first scanning signal inputted to the first touch driving line Tx, perform the noise scanning operation on the first touch driving line Tx, so as to acquire a noise of the first scanning signal, and
 the noise scanning device further comprises an additional noise scanning unit configured to perform an additional noise scanning operation on the touch panel so as to acquire the other noise,
 wherein the touch display device is provided with a predetermined characteristic value of a Tx reference signal,
 the noise scanning device further comprises a first input unit configured to, in response to the first scanning signal inputted to the first touch driving line Tx, input the Tx reference signal to a second touch driving line Tx adjacent to the first touch driving line Tx, and
 the noise scanning unit is further configured to acquire a characteristic value of a signal on the second touch driving line Tx, calculate a difference between the characteristic value of the signal on the second touch driving line Tx and the characteristic value of the Tx reference signal, and take the difference as the noise of the first scanning signal.

7. The noise scanning device according to claim 6, wherein the acquisition unit is further configured to:
 perform first noise treatment on the second scanning signal in accordance with the noise of the first scanning signal, so as to acquire the second scanning signal after the first noise treatment;
 perform second noise treatment on the second scanning signal after the first noise treatment in accordance with the other noise, so as to acquire the second scanning signal after the second noise treatment; and
 acquire a position of a first touch unit in accordance with the first scanning signal and the second scanning signal after the second noise treatment, the first touch unit corresponding to the first touch driving line Tx and the first touch sensing line Rx.

8. The noise scanning device according to claim 6, wherein the noise scanning unit is further configured to, in response to the acquisition of the second scanning signal, perform the noise scanning operation on the first touch sensing line Rx, so as to acquire a noise of the second scanning signal.

9. The noise scanning device according to claim 8, wherein the touch panel is provided with a display region and a non-display region and includes a substrate, a reference electrode group is arranged in one column on the substrate at a position corresponding to the non-display region and parallel to the touch sensing lines Rx, a plurality of additional touch driving lines Tx is arranged transversely on the substrate at positions corresponding to the reference electrode group, and the plurality of touch driving lines Tx is connected to the respective additional touch driving lines Tx and divided into n Tx groups, where n is an integer greater than 1;
 the reference electrode group comprises n reference electrodes, each reference electrode is coupled to corresponding additional touch driving lines Tx, the n Tx groups each correspond to the respective reference electrode, a first Tx group comprises the first touch driving line Tx corresponding to a first additional touch driving line Tx, a second Tx group is arranged adjacent to the first Tx group and corresponds to a second reference electrode, and the touch display device is provided with a predetermined characteristic value of a Rx reference signal;
 the noise scanning device further comprises a second input unit configured to, in response to the first scanning signal inputted to the first touch driving line Tx, input the Tx reference signal to any one of the touch driving lines Tx in the second Tx group; and
 the noise scanning unit is further configured to acquire a signal on the second reference electrode, wherein the signal on the second reference electrode is generated in accordance with the Tx reference signal and is the noise of the second scanning signal.

10. The noise scanning device according to claim 9, wherein the acquisition unit is further configured to:
 perform noise treatment on the second scanning signal in accordance with the noise of the second scanning signal, so as to acquire the second scanning signal after the noise treatment; and
 acquire a position of a first touch unit in accordance with the first scanning signal and the second scanning signal after the noise treatment, the first touch unit corresponding to the first touch driving line Tx and the first touch sensing line Rx.

11. A touch panel for a touch display device comprising a noise scanning device, the touch panel comprising a plurality of touch units arranged in an array form, a plurality of touch driving lines Tx arranged in an array form, and a plurality of touch sensing lines Rx arranged in an array form, each touch driving line Tx being arranged perpendicular to each touch sensing line Rx, the noise scanning device comprising: a touch scanning unit configured to perform a touch scanning operation on the touch panel; a noise scanning unit configured to perform a noise scanning operation on the plurality of touch driving lines Tx or the plurality of touch sensing lines Rx while the touch scanning operation is performed by the touch scanning unit; and an acquisition unit configured to acquire a position of each touch unit on the touch panel in accordance with a result of the touch scanning operation and a result of the noise scanning operation, wherein the touch panel is provided with a display region and a non-display region and comprises a substrate;

a reference electrode group is arranged in one column on the substrate at a position corresponding to the non-display region and parallel to touch sensing lines Rx, a plurality of additional touch driving lines Tx is arranged transversely on the substrate at positions corresponding to the reference electrode group, and a plurality of touch driving lines Tx is connected to the respective additional touch driving lines Tx and divided into n Tx groups, where n is an integer greater than 1; and the reference electrode group comprises n reference electrodes, each reference electrode is coupled to corresponding additional touch driving lines Tx, and the n Tx groups each correspond to the respective reference electrode.

\* \* \* \* \*